United States Patent [19]

Sakano et al.

[11] Patent Number: 5,225,758
[45] Date of Patent: Jul. 6, 1993

[54] APPARATUS FOR DRIVING A VARIABLE RELUCTANCE MOTOR

[75] Inventors: Tetsuro Sakano; Takeshi Nakamura, both of Oshino, Japan

[73] Assignee: Fanuc Ltd, Minamitsuru, Japan

[21] Appl. No.: 777,530

[22] PCT Filed: Apr. 6, 1991

[86] PCT No.: PCT/JP91/00458
§ 371 Date: Feb. 4, 1992
§ 102(e) Date: Feb. 4, 1992

[87] PCT Pub. No.: WO91/15894
PCT Pub. Date: Oct. 17, 1991

[30] Foreign Application Priority Data

Apr. 6, 1990 [JP] Japan ................................. 2-90410

[51] Int. Cl.⁵ .............................................. H02P 5/40
[52] U.S. Cl. ...................................... 318/701; 318/254
[58] Field of Search ....................... 318/701, 254, 685

[56] References Cited

U.S. PATENT DOCUMENTS

| 4,933,620 | 6/1990 | MacMinn et al. | 318/701 |
| 4,961,038 | 10/1990 | MacMinn | 318/701 |
| 5,012,171 | 4/1991 | Sember | 318/685 |

Primary Examiner—William M. Shoop, Jr.
Assistant Examiner—John W. Cabeca
Attorney, Agent, or Firm—Staas & Halsey

[57] ABSTRACT

A driving apparatus for controlling the drive of a variable reluctance motor in a manner that an average voltage applied to an exciting coil linearly changes with respect to a current deviation or a current command. If the current deviation or the current command is positive or zero, a first transistor of a driving circuit is switched ON by a signal selector circuit in dependence upon a PWM signal from a PWM circuit. A polarity determination signal from a polarity determining circuit, and an output from an ON-OFF signal generating circuit. The PWM signal is generated in dependence upon an output of an absolute value circuit. A second transistor is turned ON and OFF in accordance with the PWM signal while the output of the circuit is at a high level, so that a positive line voltage and a zero voltage are alternately generated across a coil. If the current deviation is negative, the second transistor is turned OFF by the signal selector circuit, and the first transistor is turned ON and OFF in accordance with an inverted PWM signal while the output of the circuit is at a high level, so that a negative line voltage and a zero voltage are alternately generated across the coil. Thus, a desired relationship is maintained between a driving circuit ON-OFF duty ratio, corresponding to the current deviation or the current command, and the voltage to be applied to the motor, so that the average coil voltage changes linearly with respect to the current deviation or the current command, to facilitate appropriate motor control.

12 Claims, 6 Drawing Sheets

UNSTABLE VOLTAGE APPEARING ACROSS COIL

APPARATUS FOR DRIVING A VARIABLE RELUCTANCE MOTOR

BACKGROUND OF THE INVENTION

1. Field of the Invention

The present invention relates to an apparatus for driving a variable reluctance motor 2. Description of the Related Art A variable reluctance motor, which includes a stator having a plurality of salient poles around which exciting coils are wound and a rotor having a plurality of salient poles, is so arranged as to rotate the rotor by means of magnetic attraction forces produced by the salient poles of excited stators, rotor salient poles concerned being attracted by the forces toward these stator salient poles. A rotary torque applied to the rotor acts in the direction to decrease the reluctance between the stator salient poles and the rotor salient poles regardless of the direction of electric currents flowing through the exciting coils. Thus, the acting direction of the rotary torque is determined in dependence on the rotary position of the rotor which indicates the positional relationship between the stator salient poles and the rotor salient poles. For this reason, to run the motor in a desired rotational direction, generally, a PWM signal is applied to either a first pair of switching elements Q1 and Q2 or a second pair of switching elements Q3 and Q4 in an H bridge circuit (FIG. 1), which is interposed between a DC power supply E and the exciting coil L for a respective phase, while an inverted PWM signal is applied to the other switching element pair, so that the first and second pairs of switching elements are turned ON and OFF alternately, thereby successively exciting the stator salient poles of individual phases in a required order for a required rotational angular region of the rotor.

Figure 1:
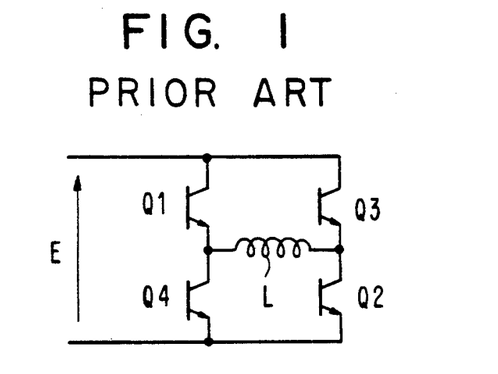
FIG. 1 is a circuit diagram showing an H bridge circuit conventionally known as a driving circuit for a variable reluctance motor.

When the H bridge circuit of FIG. 1 is used, an exciting current whose polarity alternates flows through the exciting coil L. In the variable reluctance motor wherein the acting direction of the rotary torque does not depend on the direction of the exciting current, however, it is permitted to cause the exciting current to flow in one direction. From such a viewpoint, motor driving circuits, shown in FIGS. 2 and 3, each using a pair of diodes instead of either one of the switching element pairs in the H bridge circuit shown in FIG. 1, have been proposed in an attempt to simplify the circuit configuration and reduce costs.

Figure 4:
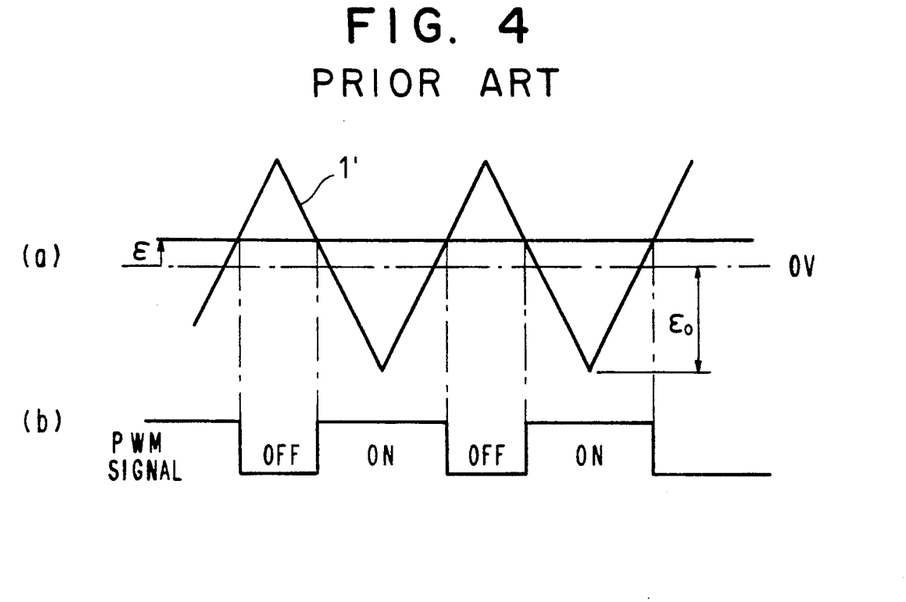
FIG. 4 is a waveform diagram showing a principle of generation of a PWM signal applied to the driving circuit of FIG. 2.

According to these proposals, a carrier signal 1' having an amplitude of $\epsilon 0$ is compared with a current deviation $\epsilon$ at a central level (OV) of the carrier signal 1', as shown in FIG. 4, to thereby generate a PWM signal of a duty ratio $\alpha$ represented by equation (1) given below:

$$\alpha = (\epsilon + \epsilon 0)/2\epsilon 0 \qquad (1)$$

Figure 2:
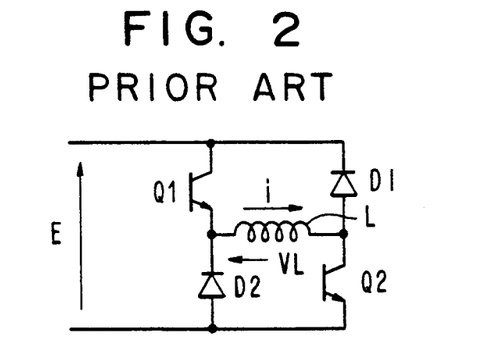
FIG. 2 is a circuit diagram showing a driving circuit employing a pair of diodes in place of transistors of the H bridge circuit.
Figure 3:
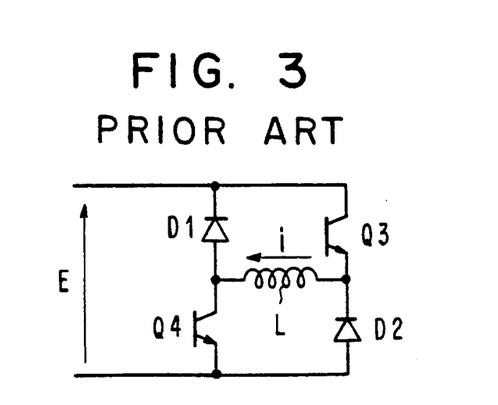
FIG. 3 is a circuit diagram showing a driving circuit employing a pair of diodes in place of another pair of transistors of the H bridge circuit.
Figure 5:
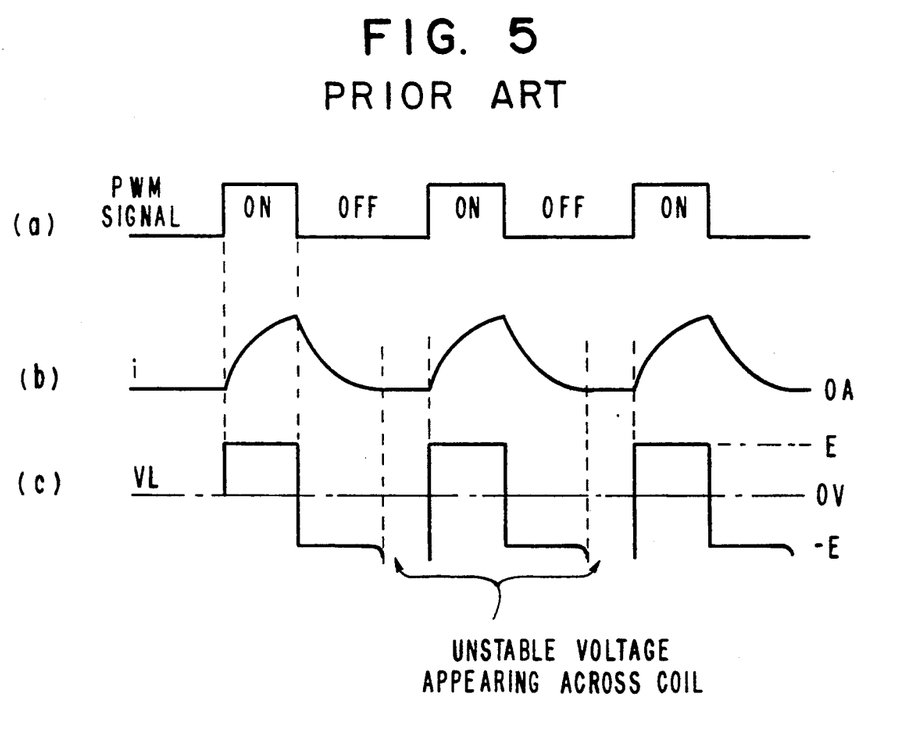
FIG. 5 is a waveform diagram showing changes in a coil current and a voltage across the coil when the driving circuit of FIG. 2 operates in response to a PWM signal of a duty ratio of 50% or less.

In the case of applying the PWM signal to, e.g., the switching elements Q1 and Q2 of the driving circuit shown in FIG. 2, when both the switching elements are simultaneously turned on, an electric current i (FIG. 5 (b)), which rises with a time constant that depends on the inductance and resistance of the exciting coil L, flows from a DC power supply E to the switching element Q1, the exciting coil L, the switching element Q2, and back to the DC power supply E. As a result, a positive voltage $+E$ whose magnitude is approximately equal to a DC line voltage E is generated across the coil L. On the other hand, when these switching elements are turned off, the current i, which falls with the time constant of the exciting coil L, flows back to the DC power supply E through a diode D2, the exciting coil L, and a diode D1, thus producing a negative DC line voltage $-E$ across the coil L.

If the ON-OFF duty ratio $\alpha$ of the PWM signal exceeds a value (e.g. 50%) associated with the time constant of the exciting coil L or the like, the voltage across the coil is alternately changed between $+E$ and $-E$, as described above, while the PWM signal is turned ON and OFF. In this case, referring to FIG. 4, an average voltage VLa applied to the exciting coil L is given by equation (2). In other words, the average voltage VLa changes linearly with respect to the duty ratio $\alpha$ and the current deviation $\epsilon$.

$$\begin{aligned} VLa &= E \cdot \epsilon/\epsilon 0 \\ &= E(2\alpha - 1) \end{aligned} \qquad (2)$$

On the other hand, if the duty ratio $\alpha$ of the PWM signal is, e.g., 50% or less, when the current i gradually decreases to a value of "0," after the PWM signal is turned OFF, as shown in FIG. 5, the exciting coil L whose both ends are connected to the switching element Q1 and diode D1 which are in OFF states and to similar circuit elements Q2 and D2 is brought in a floated state, so that a voltage VL across the exciting coil L is rendered unstable. Therefore, if the duty ratio $\alpha$ is 50% or less, then equation (2) cannot be fulfilled between the average voltage VLa, the line voltage E, and the duty ratio $\alpha$. In other words, the average voltage VLa changes nonlinearly with respect to the current deviation $\epsilon$. This causes difficulties in controlling the motor.

Summary of the Invention

An object of the present invention is to provide a driving apparatus capable of controlling the drive of a variable reluctance motor in such a manner that an average voltage applied to an exciting coil changes linearly with respect to a current deviation or a current command.

To achieve the aforementioned object, according to one aspect of the present invention, an apparatus for driving a variable reluctante motor comprises a DC power supply, and driving sections which are the same in number as the phases of the motor. Each of the driving sections includes a driving circuit for energizing and deenergizing an exciting coil corresponding thereto, signal generating means for comparing an absolute value of a current deviation of an actual current from a current command used for closed-loop motor current control with a carrier signal, with use of the lowest level of the carrier signal as a reference level for the comparison, to thereby produce a PWM signal, and control means for controlling the operation of the driving circuit. Each driving circuit includes a first switching element connected between one end of the exciting coil and the positive pole of the DC power supply, a second switching element connected between the other end of the exciting coil and the negative pole of the DC power supply, a first diode whose anode is connected to a junction of the second switching element and the exciting coil and whose cathode is connected to the positive pole of the DC power supply, and a second diode whose anode is connected to the negative pole of the DC power supply and whose cathode is connected to the junction of the first switching element and the exciting coil. The control means is operable to cause either one of the first and second switching elements to be turned on and cause the other switching element to be turned on and off in accordance with the PWM signal, if the current deviation is positive or zero, and is operable to cause the one switching element to be turned on and off in accordance with a signal which is obtained by inverting the PWM signal and cause the other switching element to be turned off, if the current deviation is negative.

According to another aspect of the present invention, each PWM signal generating means of the driving apparatus is operable to compare a current command which has one polarity and which is used for open-loop motor current control with the carrier signal, with use of the lowest level of the carrier signal as the reference level for the comparison, to thereby produce a PWM signal. Each control means is operable to cause either one of the first and second switching elements to be turned on in accordance with the current command, and cause the other switching element to be turned on and off in accordance with the PWM signal.

Preferably, a resistor is further included which is connected in series with a corresponding one of the first and second diodes, the corresponding one diode being operable to cause opposite ends of the exciting coil to be short-circuited in cooperation with one of the first and second switching elements which is always turned on, during the switching element ON-OFF control effected in accordance with the PWM signal, or which is turned on and off in accordance with the inverted PWM signal. Preferably, further included are a third diode connected between the DC power supply and the respective driving circuit or between the DC power supply and one of the driving circuits for the individual phases, in such a direction that permits the current supply from the DC power supply to the driving circuit, and a capacitor connected across a series circuit which consists of the DC power supply and the third diode connected between the DC power supply and the respective driving circuit or one of the driving circuits for the individual phases.

As discussed above, according to the present invention, a current command is compared with the carrier signal or an absolute value of a current deviation is compared with the carrier signal, with use of the lowest level of the carrier signal as the comparison reference level, to thereby generate a PWM signal; in response to the current command or a positive or zero current deviation, either the first or second switching element is turned on and the other switching element is turned on. and off in accordance with to the PWM signal; and, in response to a negative current deviation, the one switching element is turned on and off in accordance with the inverted PWM signal and the other switching element is turned off. This makes it possible to control the drive of a variable reluctance motor such that the average voltage applied to the exciting coil changes linearly with respect to the current command or current deviation, by using a driving circuit which includes a pair of switching elements and a pair of diodes. Thus, stable, accurate and easy motor control can be achieved.

Preferably, a resistor is connected in series with either the first or second diode which short-circuits the both ends of the exciting coil in cooperation with either the first or second switching element which is turned on and off in accordance with the inverted PWM signal. Thus, the exciting coil current can be promptly extinguished upon decelerated operation of the motor. Preferably, a third diode is connected between the DC power supply and the respective driving circuit or between the DC power supply and one of the driving circuits for the individual phase in such a direction that permits the current supply from the DC power supply to the driving circuit, and a capacitor is connected across a series circuit which consists of the DC power supply and the third diode connected between the DC power supply and the respective driving circuit or one of the driving circuits for the individual phases. This makes it possible to obtain the exciting coil current which rapidly rises and falls.

DESCRIPTION OF THE PREFERRED EMBODIMENTS

Figure 6:
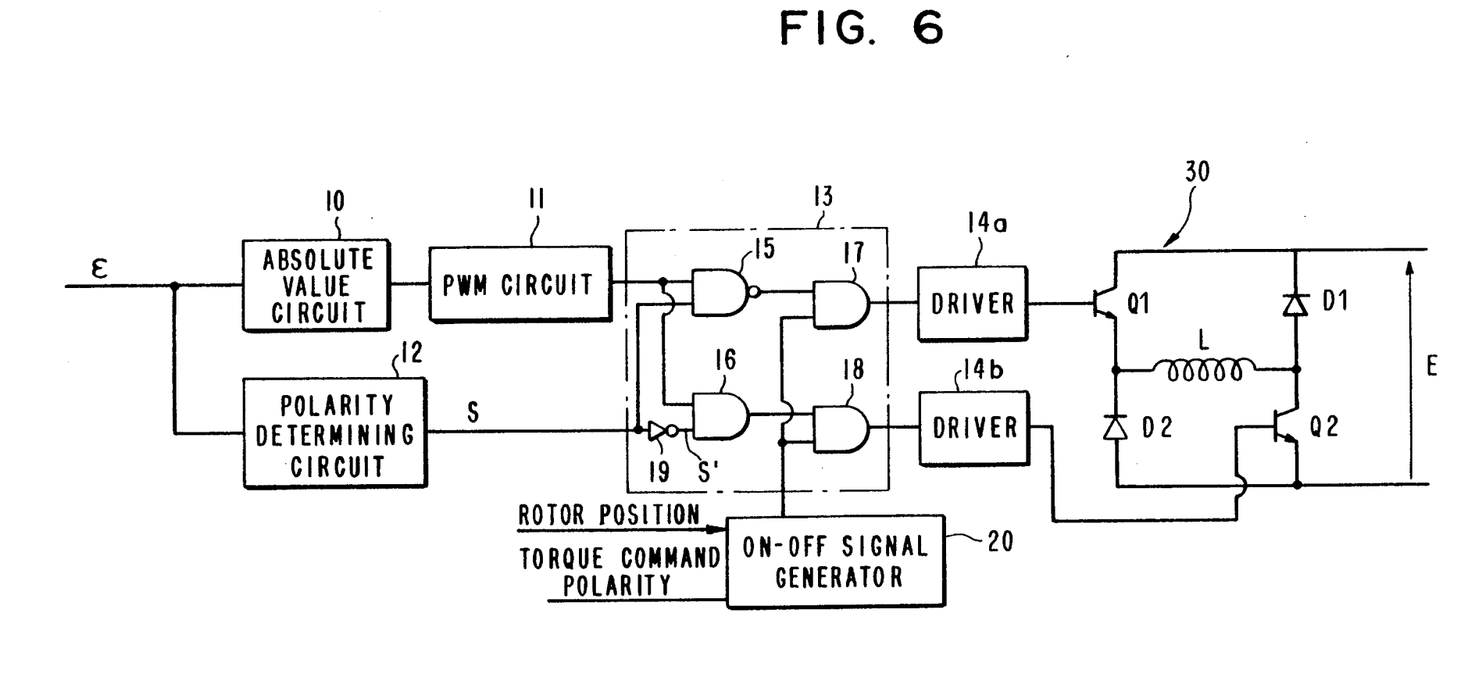
FIG. 6 is a block diagram showing a driving apparatus for a variable reluctance motor according to an embodiment of the present invention.

A driving apparatus of an embodiment of the present invention, which is mounted on a multi-phase variable reluctance motor, is provided with driving sections which are the same in number as the phases of the motor, one of the driving sections being shown in FIG. 6. In the following, a driving section of the driving apparatus, corresponding to one of the phases of the motor, will be explained.

Referring to FIG. 6, the driving section is provided with an absolute value circuit 10 for receiving a current deviation $\epsilon$ supplied from a host controller (not shown) and indicative of a deviation of an actual current from a current command used for closed-loop motor current control, to generate an output which is indicative of an absolute value $|\epsilon|$ of the current deviation, and a PWM circuit 11 for comparing the output signal from the circuit 10 with a carrier signal, to generate a PWM signal. The PWM circuit 11 includes an analog circuit, a processor for performing numeric calculation, and the like.

Figure 8:
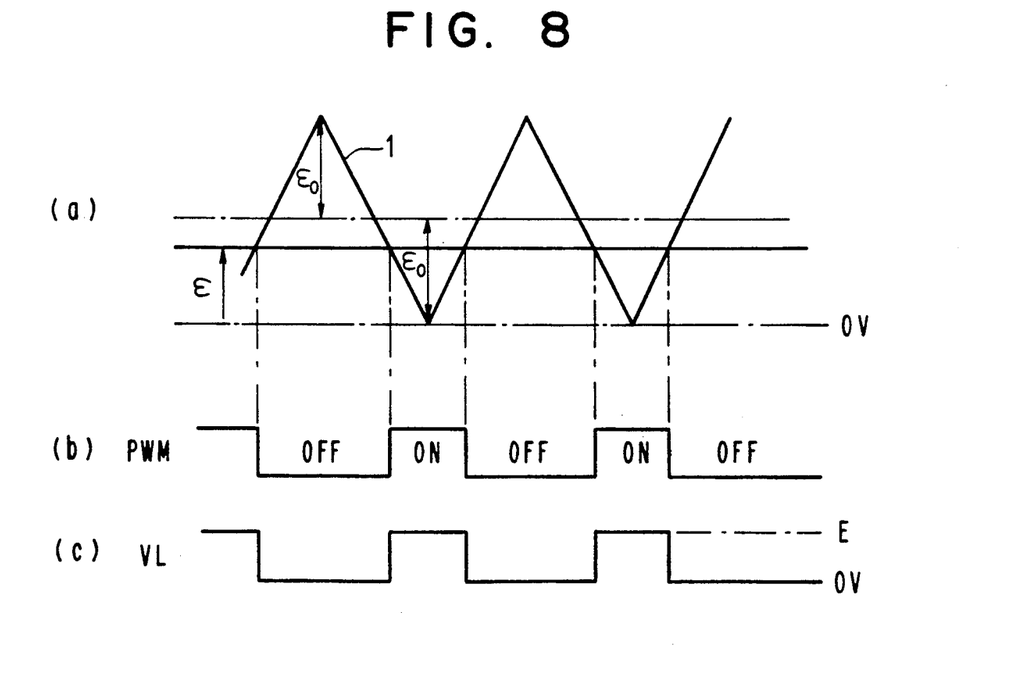
FIG. 8 is a waveform diagram showing a PWM signal generated by the driving apparatus of FIG. 6 in accordance with a positive current deviation, or a PWM signal and a voltage across the coil in a modification (i.e., open loop) of the driving apparatus of FIG. 6.

As shown in FIG. 8(a), in the PWM circuit 11, a carrier signal 1 whose lowest level is 0 volt is employed in place of a conventional carrier signal 1' (FIG. 4) whose central level is 0 volt. The carrier signal 1 corresponds to one obtained by shifting the conventional carrier signal 1' in the positive direction by the amplitude $\epsilon_0$ of the latter signal. The PWM circuit 11 is operable to compare the absolute value $|\epsilon|$ of the current deviation with the carrier signal 1, with use of the lowest level (=0 volt) of the carrier signal 1 as the comparison reference level, as shown in FIG. 8, to produce a PWM signal. The PWM signal assumes a high level when the absolute value $|\epsilon|$ of the current deviation is equal to or greater than the carrier signal 1, while it assumes a low level when the value $|\epsilon|$ is smaller than the carrier signal 1.

The driving section further includes a polarity determining circuit 12 for determining the polarity of the current deviation $\epsilon$, to generate a signal S which indicates the result of determination. The polarity determination signal S assumes a low level when the current deviation $\epsilon$ is positive or zero (0 volt or more), while it assumes a high level when the deviation $\epsilon$ is negative (below 0 volt). Further, the driving section includes a driving circuit 30 for energizing and deenergizing a corresponding one of exciting coils for the individual phases, and a signal selector circuit 13 for switching, in dependence on the sign of the current deviation $\epsilon$, the route through which a PWM signal and an ON-OFF signal generating circuit output (mentioned later) are applied to the driving circuit 30. The signal selector circuit 13 cooperates with the polarity determining circuit 12 to constitute controlling means for controlling the driving circuit 30. Drivers 14a and 14b are interposed between the signal selector circuit 13 and the driving circuit 30. The driving apparatus further includes a DC power supply E, common to the individual phases, and a circuit 20 for generating an ON-OFF signal in accordance with the position of the motor rotor and the polarity of the torque command, the ON-OFF signal causing the exciting coils for the individual phases to be energized and deenergized.

More specifically, the signal selector circuit 13 has a NAND circuit 15, first to third AND circuits 16-18, and an inverter 19. The NAND circuit 15 has its first and second input terminals respectively connected to the output terminal of the PWM circuit 11 and that of the polarity determining circuit 12, and an output terminal thereof connected to a first input terminal of the second AND circuit 17. The first AND circuit 16 has a first input terminal connected to the output terminal of the PWM circuit 11, a second input terminal connected to the output terminal of the polarity determining circuit 12 through the inverter 19, and an output terminal connected to the first input terminal of the third AND circuit 18. Second input terminals of the second and third AND circuits 17, 18 are connected to an output terminal of the ON-OFF signal generating circuit 20, and output terminals of these AND circuits are connected to input terminals of the first and second drivers 14a and 14b, respectively.

The driving circuit 30 includes first and second switching transistors (generally, first and second switching elements) Q1 and Q2, and first and second diodes D1 and D2. The bases of these transistors Q1, Q2 are connected to the output terminals of the drivers 14a and 14b. The collector and emitter of the first transistor Q1 are connected to the positive pole of the power supply E and one end of the coil L, respectively. The collector and emitter of the second transistor Q2 are connected to the other end of the coil L and the negative pole of the power supply E. The first diode D1 has its anode connected to the junction of the second transistor Q2 and the coil L, and the cathode connected to the positive pole of the power supply E. The second diode D2 has the anode connected to the negative pole of the power supply E, and the cathode connected to the junction of the first transistor Q1 and the coil L.

In the following, the operation of the driving section shown in FIG. 6 will be explained.

When the current deviation $\epsilon$ is positive or zero, the PWM circuit 11 receives an output, indicative of a value $|\epsilon|$ of the current deviation, from the absolute value circuit 10, and generates a PWM signal corresponding to the PWM signal shown in FIG. 8 (b). The duty ratio $\alpha$ of the PWM signal is expressed by equation (3):

$$\alpha = |\epsilon|/2\epsilon_0 \qquad (3)$$
$$= \epsilon/2\epsilon_0$$

The polarity determining circuit 12 produces a polarity determination signal S at a low level. Because the signal S is at the low level, the NAND circuit 15 which receives the PWM signal and the polarity determination signal S always generates a high-level output signal. The low-level polarity determination signal S is inverted to a high level by the inverter 19. Because the inverted polarity determination signal S' is at a high level, the first AND circuit 16 which receives the PWM signal and the inverted polarity determination signal S' is enabled, so that the PWM signal is applied to the third AND circuit 18 through the first AND circuit 16.

In accordance with the rotor position and the polarity of the torque command, the ON-OFF signal generating circuit 20 produces a high-level output signal for a time period for which the exciting coils for the individual phases should be energized. The second and third AND circuits 17 and 18 are enabled while the high-level output signal is being sent from the ON-OFF signal generating circuit 20. As a result, the high-level output signal of the NAND circuit 15 is applied to the base of the first transistor Q1 through the second AND circuit 17 and the first driver 14a, causing the first transistor Q1 to be turned ON (the first switching element is turned on). Also, the PWM signal from the first AND circuit 16 is applied to the base of the second transistor Q2 through the third AND circuit 18 and the second driver 14b, so that the second transistor Q2 is turned ON and OFF in accordance with the PWM signal.

Since the first transistor Q1 is in its ON state, the exciting coil L is connected to the DC power supply E through the transistors Q1 and Q2 when the latter transistor Q2 is turned ON, so that an electric current flows through the coil L to generate a positive DC line voltage $+E$ across the coil. On the other hand, when the second transistor Q2 is turned OFF, the opposite ends of the exciting coil L are short-circuited through the first transistor Q1 and the first diode D1, so that the voltage across the coil is rendered to be 0 volt. As a result, the voltage VL across the exciting coil L changes as shown in FIG. 8 (c) in accordance with turning ON and OFF of the second transistor Q2. In other words, a desired relationship is maintained between the ON-OFF operation of the first and second transistors Q1 and Q2, effected at a duty ratio $\alpha$ in accordance with the positive or zero current deviation $\epsilon$, and the voltage to be applied to the motor while the transistors are turned ON and OFF. The average coil voltage VLa is expressed by equation (4) given below:

$$VLa = E \cdot \alpha \qquad (4)$$
$$= E \cdot \epsilon/2\epsilon 0$$

As is apparent from equation (4), the average coil voltage VLa changes linearly with respect to the current deviation $\epsilon$ and the duty ratio $\alpha$. In other words, as long as the current deviation $\epsilon$ falls within a region where the deviation is positive or zero, a desired average voltage corresponding to the duty ratio $\alpha$ is applied to the motor regardless of a value of the duty ratio $\alpha$ which corresponds to the current deviation $\alpha$, so that motor control is performed in an appropriate manner.

Next, an explanation will be given for the case where the current deviation $\epsilon$ is negative.

Figure 7:
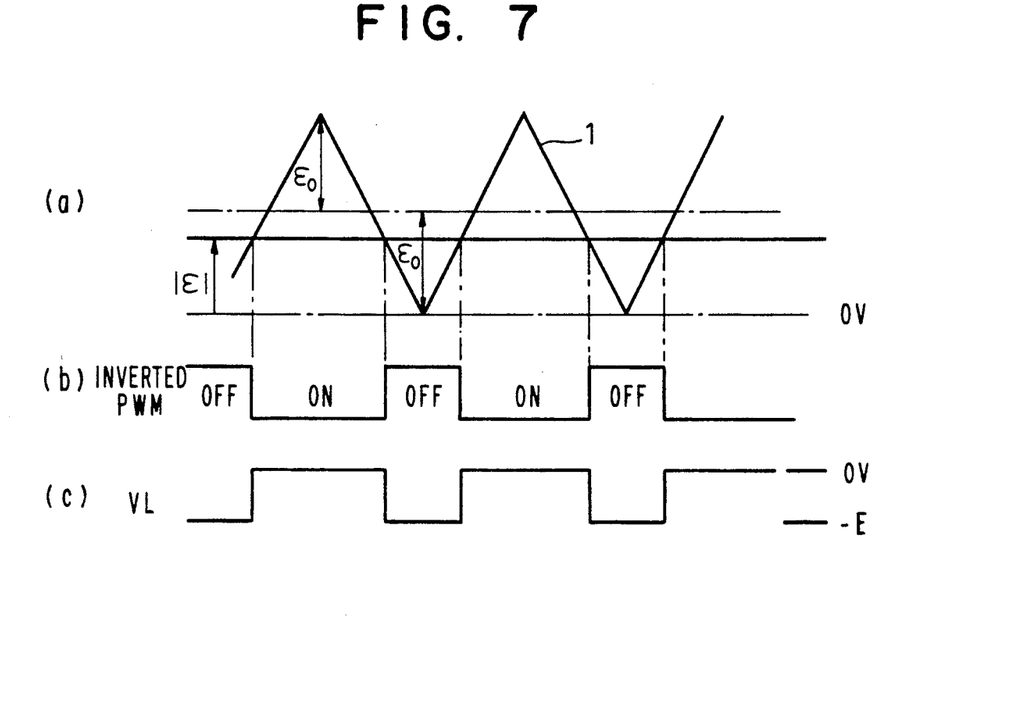
FIG. 7 is a waveform diagram showing an inverted PWM signal generated by the driving apparatus of FIG. 6 in accordance with a negative current deviation, together with a voltage across the coil.

The PWM circuit 11 produces a PWM signal, and the polarity determining circuit 12 generates a high-level polarity determination signal S. Since the signal S is at a high level, the NAND circuit 15 is enabled, so that an output signal, corresponding to one obtained by inverting the PWM signal, is delivered from the NAND circuit 15. Namely, the output signal (inverted PWM signal) of the NAND circuit 15 is at a low level when the PWM signal is at a high level, while the output signal is at a high level when the PWM signal is at a low level. The duty ratio $\alpha$ of the inverted PWM signal (FIG. 7 (b)) is expressed by equation (5):

$$\alpha = |\epsilon|/2\epsilon 0 \qquad (5)$$
$$= -\epsilon/2\epsilon 0$$

Since the output signal (inverted polarity determination signal S') of the inverter 19 is at a low level, the first AND circuit 16 is disabled. As a result, the output signals of the first and third AND circuits 16, 18 and the resultant output signal of the second driver 14b are kept at their low levels, causing the second transistor Q2 to be turned OFF.

On the other hand, the second AND circuit 17 is enabled as long as the output signal of the ON-OFF signal generating circuit 20 is kept at the high level. Accordingly, during that time, the output signal (inverted PWM signal) of the NAND circuit 15 is applied to the base of the first transistor Q1 through the second AND circuit 17 and the first driver 14a, so that the transistor Q1 is turned ON and OFF in accordance with the inverted PWM signal. Since the second transistor Q2 is in an OFF state, the opposite ends of the exciting coil L are short-circuited with each other through the first transistor Q1 and the first diode D1 when the first transistor Q1 is turned ON. Thus, a 0-volt voltage is generated across the coil. If the first transistor Q1 is turned OFF, then the energy stored in the exciting coil L causes an electric current, directing from the second diode D2 to the first diode D1, to flow through the exciting coil L, to thereby generate a negative DC line voltage $-E$ across the coil L. As a result, the voltage VL across the exciting coil changes as shown in FIG. 7 (c) in accordance with the ON-OFF action of the first transistor Q1, as long as the output signal of the ON-OFF signal generating circuit 20 is kept at a high level. Thus, a desired relationship is maintained between the ON-OFF actions of the first and second transistors Q1, Q2, effected at a duty ratio $\alpha$ in accordance with the negative current deviation $\epsilon$, and the corresponding voltage to be applied to the motor.

When the output signal of the ON-OFF signal generating circuit 20 switches to the low level, both the first and second transistors Q1 and Q2 are turned OFF.

The average voltage VLa of the coil when the current deviation $\epsilon$ is negative is expressed by equation (6):

$$VLa = -E \cdot \alpha \qquad (6)$$

By substituting equation (5) for equation (6), the following formula is given:

$$VLa = E \cdot \epsilon/2\epsilon 0 \qquad (7)$$

Figure 9:
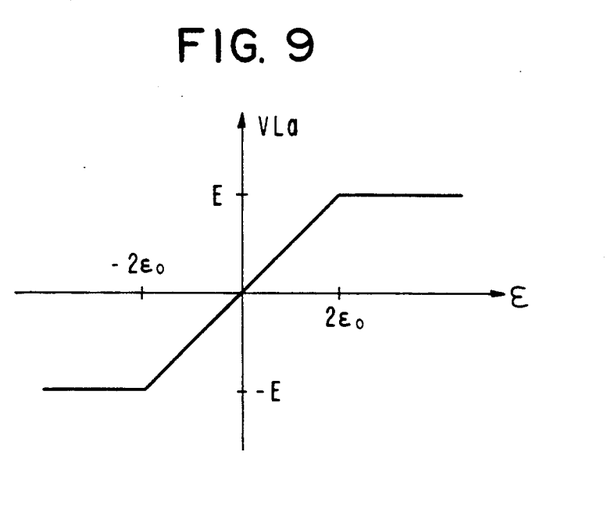
FIG. 9 is a graph showing the relationship between an average voltage across the coil and a current deviation in the driving apparatus of FIG. 6.

As is obvious from equation (7), the average voltage VLa of the coil changes linearly with respect to the current deviation $\epsilon$ and the duty ratio $\alpha$. Therefore, even in a region where the current deviation $\epsilon$ is negative, a desired average voltage corresponding to the duty ratio $\alpha$ is applied to the motor regardless of the value of the duty ratio $\alpha$, thus ensuring appropriate motor control. FIG. 9 shows a curve which corresponds equations (4), (7) and which shows the relationship between the average coil voltage VLa and the current deviation $\epsilon$.

The present invention is not limited to the above embodiment, and various modifications thereof may be made.

For instance, in the embodiment, the current deviation $\epsilon$ of the actual current from the current command used for the closed-loop motor current control is applied to the driving apparatus, but a current command (torque command) having one polarity (typically positive) used for the open-loop motor current control may be applied instead. In this case, the absolute value circuit 10 and the polarity determining circuit 12 are removed, and an AND circuit corresponding to the second AND circuit 17 is used in place of the signal selector circuit 13. Then, the current command is applied to the PWM circuit 11, and two input terminals and an output terminal of the AND circuit are connected to the output terminal of the PWM circuit 11, the output signal of the ON-OFF signal generating circuit 20, respectively, and the input terminal of the first driver 14a. Further, the output terminal of the ON-OFF signal generating circuit 20 is connected to the input terminal of the second driver 14b. In this case, the first transistor Q1 is turned ON and OFF in accordance with the PWM signal shown in FIG. 8 as long as the output signal of the ON-OFF signal generating circuit 20 is at a high level, and is in an OFF state when the output signal of the circuit 20 is at a low level. The second transistor Q2 is turned ON and OFF in accordance with the output signal of the ON-OFF signal generating circuit 20.

Further, in place of the carrier signal 1 used in the embodiment, the conventional carrier signal 1' (FIG. 4) may be used. In this case, it is only required to shift the current deviation $\epsilon$ in the negative direction by the amplitude $\epsilon 0$ of the carrier signal. Also, in place of the triangular carrier signal, other type of carrier signal such as a sawtooth carrier signal may be used.

In the embodiment, the first driver 14a is connected to the first switching element Q1, and the second driver 14b to the second switching element Q2, but the driver 14a may be connected to the second switching element Q2 and the driver 14b to the first switching element Q1. Further, in the embodiment, the present invention is applied to the driving circuit shown in FIG. 2, but it may be also applied to the driving circuit shown in FIG. 3. Furthermore, in place of the first and second switching transistors Q1 and Q2, other switching elements may be used.

Figure 10:
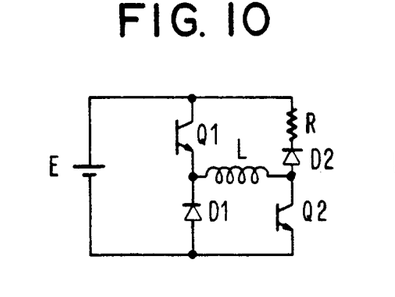
FIG. 10 is a circuit diagram showing a driving circuit according to a modification of the present invention which includes a resistor for promptly extinguishing the coil current generated during a decelerated operation of the motor.
Figure 11:
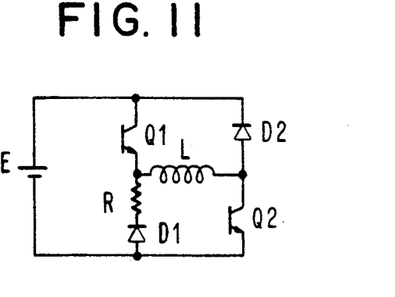
FIG. 11 is a diagram showing a modification similar to FIG. 10.

In addition, as shown in FIGS. 10 and 11, a resistor R may be connected in series with the diode D1 or D2 which short-circuits the opposite ends of the exciting coil L in cooperation with the transistor Q1 or Q2 which is on-off controlled in accordance with the inverted PWM signal. In this case, when a negative current deviation (current command) $\epsilon$ is applied to effect a decelerated operation of the motor, an electric current flowing through the coil L due to the energy stored in the exciting coil is quickly extinguished by the current consumption in the resistor R. If the first transistor Q1 is turned ON and OFF in accordance with the inverted PWM signal, then the driving circuit of FIG. 10 is used, and if the second transistor Q2 is turned ON and OFF, the driving circuit of FIG. 11 is used.

Figure 12:
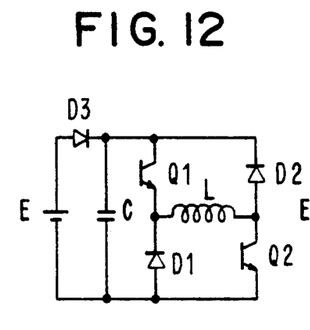
FIG. 12 is a circuit diagram showing a driving circuit according to another modification of the present invention which includes diodes and a capacitor for ensuring prompt rise and fall of the coil current.
Figure 13:
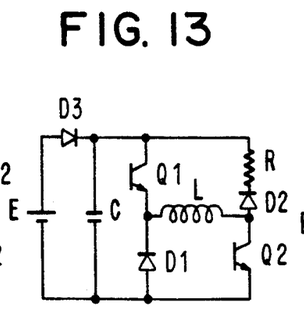
FIG. 13 is a diagram showing a modification similar to FIG. 12.
Figure 14:
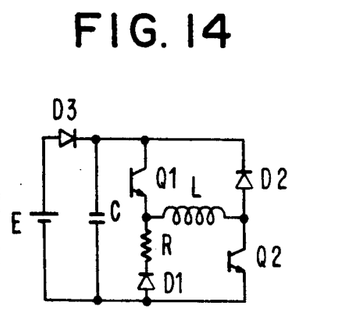
FIG. 14 is a diagram showing a modification similar to FIG. 12.
Figure 15:
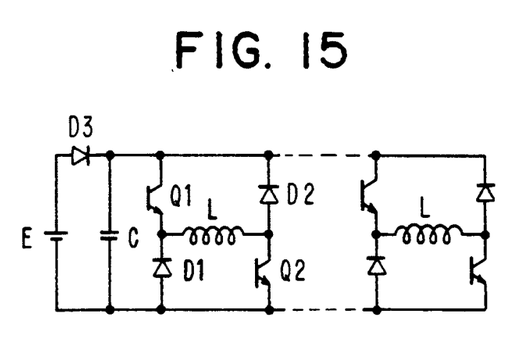
FIG. 15 is a diagram showing another modification of the present invention which uses a set of diodes and a capacitor, in common to driving circuits for individual phases, for ensuring quick rise and fall of the coil current.
Figure 16:
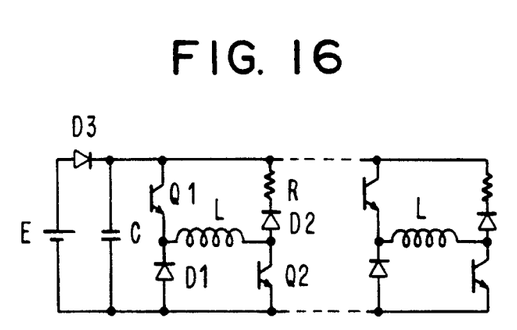
FIG. 16 is a diagram showing a modification similar to FIG. 15.
Figure 17:
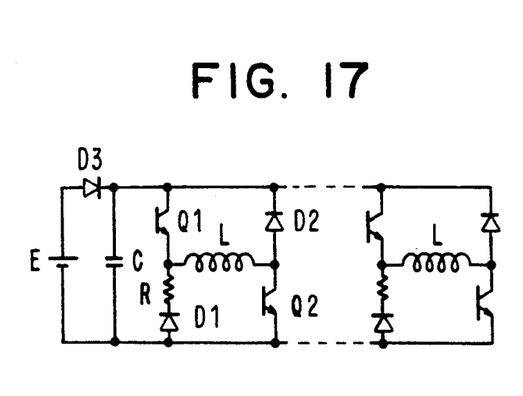
FIG. 17 is a diagram showing a modification similar to FIG. 15.

In order to ensure prompt rise and fall of exciting coil currents, as shown in FIG. 12, the third diode D3 may be connected between the DC power supply E and the respective driving circuit in such a direction that permits the current supply from the power supply E to the driving circuit, and a capacitor C may be connected across a series circuit which consists of the power supply E and the third diode D3 for each driving circuit. In this case, as described in the Japanese patent application No. 1074/1990, the capacitor C is charged with a feedback current from the exciting coil L to thereby quickly drop the coil current, while it is discharged upon start of the next energizing cycle of the exciting coil L to thereby quickly raise the coil current. FIGS. 13 and 14 show the combinations of the third diode D3 and the capacitor C with the driving circuits of FIGS. 10 and 11, respectively. The provision of the third diode D3 and the capacitor C in each driving circuit is not essential: as shown in FIG. 15, a set of diode D3 and the capacitor C may be shared by all the driving circuits for the individual phases. FIGS. 16 and 17 show combinations of the set of the diode D3 and the capacitor C with the driving circuits, each having the circuit configurations shown in FIG. 10 or FIG. 11, for the individual phases.

We claim:

1. A driving apparatus for a variable reluctance motor, having a DC power supply, comprising:

plural driving sections, each of the plural driving sections including a driving circuit for energizing and deenergizing an exciting coil corresponding thereto, signal generating means for comparing an absolute value of a current deviation of an actual current from a current command used for closed-loop motor current control with a carrier signal, with use of a lowest level of the carrier signal as a reference level for the comparison, to produce a PWM signal, and controlling means for controlling an operation of said driving circuit;

each of said driving circuits including a first switching element connected between one end of the exciting coil and a positive pole of the DC power supply, a second switching element connected between the other end of the exciting coil and a negative pole of the DC power supply, a first diode whose anode is connected to a junction of the second switching element and the exciting coil and whose cathode is connected to the positive pole of said DC power supply, and a second diode whose anode is connected to the negative pole of said DC power supply and whose cathode is connected to a junction of the first switching element and the exciting coil; and said controlling means being operable to cause one of said first and second switching elements to be turned on and to cause the other switching element to be turned on and off in accordance with the PWM signal, if the current deviation is positive or zero, and being operable to cause said one switching element to be turned on and off in accordance with a signal which is obtained by inverting the PWM signal and to cause said other switching element to be turned off, if the current deviation is negative.

2. The driving apparatus according to claim 1, further comprising:

a resistor connected in series with a corresponding one of said first and second diodes, said corresponding one diode being operable to cause opposite ends of the exciting coil to be short-circuited in cooperation with one of said first and second switching elements which is on-off controlled in accordance with said inverted PWM signal.

3. The driving apparatus according to claim 1, wherein each driving section further includes:

a third diode connected between the DC power supply and the driving circuit in such a direction that permits current to flow from the DC power supply to the driving circuit; and a capacitor connected across a series circuit which includes said third diode and the DC power supply.

4. The driving apparatus according to claim 1, further comprising:

a third diode connected between the DC power supply and one of the driving circuits in such a direction that permits current to flow from the DC power supply to the driving circuit; and a capacitor connected across a series circuit which includes said third diode and the DC power supply.

5. A driving apparatus for a variable reluctance motor, having a DC power supply, comprising:

plural driving sections which are the same in number as phases of the motor, each of the plural driving sections including a driving circuit for energizing and deenergizing an exciting coil corresponding thereto, signal generating means for comparing a current command which has one polarity and which is used for open-loop motor current control with a carrier signal, with use of a lowest level of the carrier signal as a reference level for the comparison, to generate a PWM signal, and controlling means for controlling an operation of said driving circuit;

each of said driving circuits including a first switching element connected between one end of the exciting coil and a positive pole of the DC power supply, a second switching element connected between the other end of the exciting coil and a negative pole of the DC power supply, a first diode whose anode is connected to a junction of said second switching element and the exciting coil and whose cathode is connected to the positive pole of the DC power supply, and a second diode whose anode is connected to the negative pole of the DC power supply and whose cathode is connected to a junction of said first switching element and said exciting coil; and said controlling means being operable to cause one of said first and second switching elements to be turned on in accordance with the current command, and cause the other switching element to be turned on and off in accordance with the PWM signal.

6. The driving apparatus according to claim 5, further comprising:

a resistor connected in series with one of said first and second diodes which is different from the other diode which is operable to cause opposite ends of the exciting coil to be short-circuited in cooperation with one of said first and second switching elements which is always turned on while the switching element on-off control is performed in accordance with the PMW signal.

7. The driving apparatus according to claim 5, wherein each driving section further includes:

a third diode connected between the DC power supply and the driving circuit in such a direction that permits current to flow from the DC power supply to the driving circuit; and a capacitor connected across a series circuit which includes said third diode and the DC power supply.

8. The driving apparatus according to claim 5, further comprising:

a third diode connected between the DC power supply and one of the driving circuits in such a direction that permits current to flow from the DC power supply to the driving circuit; and a capacitor connected across a series circuit which includes said third diode and the DC power supply.

9. The driving apparatus according to claim 2, wherein each driving section further includes:

a third diode connected between the DC power supply and the driving circuit in such a direction that permits current to flow from the DC power supply to the driving circuit; and a capacitor connected across a series circuit which includes said third diode and the DC power supply.

10. The driving apparatus according to claim 2, further comprising:

a third diode connected between the DC power supply and one of the driving circuits in such a direction that permits current to flow from the DC power supply to the driving circuit; and a capacitor connected across a series circuit which includes said third diode and the DC power supply.

11. The driving apparatus according to claim 6, wherein each driving section further includes:

a third diode connected between the DC power supply and the driving circuit in such a direction that permits current to flow from the DC power supply to the driving circuit; and a capacitor connected across a series circuit which includes said third diode and the DC power supply.

12. The driving apparatus according to claim 6, further comprising:

a third diode connected between the DC power supply and one of the driving circuits in such a direction that permits current to flow from the DC power supply to the driving circuit; and a capacitor connected across a series circuit which includes said third diode and the DC power supply.

* * * * *